(12) United States Patent
Bender

(10) Patent No.: US 6,684,725 B2
(45) Date of Patent: Feb. 3, 2004

(54) SYSTEM HAVING A UNIT FOR CONTROLLING A TRANSMISSION LINE

(75) Inventor: Helmut Bender, Pleidelsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/269,090

(22) Filed: Oct. 11, 2002

(65) Prior Publication Data

US 2003/0106383 A1 Jun. 12, 2003

(30) Foreign Application Priority Data

Oct. 13, 2001 (DE) ............................ 101 50 720

(51) Int. Cl.[7] ............................................. F16H 59/42
(52) U.S. Cl. ........................ 74/336 R; 74/339; 74/335
(58) Field of Search ..................... 74/339, 336 R, 74/335

(56) References Cited

U.S. PATENT DOCUMENTS

| | | | | |
|---|---|---|---|---|
| 4,519,484 A | * | 5/1985 | Nagaoka et al. | 74/336 R |
| 4,676,115 A | * | 6/1987 | Morscheck et al. | 74/339 |
| 6,164,149 A | * | 12/2000 | Ohmori et al. | 74/336 R |
| 6,227,063 B1 | * | 5/2001 | Ohmori et al. | 74/335 |
| 6,276,224 B1 | * | 8/2001 | Ueda et al. | 74/335 |
| 6,389,916 B1 | * | 5/2002 | Fukuda | 74/335 |
| 6,619,152 B2 | * | 9/2003 | Ochi et al. | 74/335 |

FOREIGN PATENT DOCUMENTS

WO          93/10378          5/1993

\* cited by examiner

Primary Examiner—Dirk Wright
Assistant Examiner—Eric M. Williams
(74) Attorney, Agent, or Firm—Crowell & Moring LLP

(57) ABSTRACT

A system includes a unit for controlling a transmission line of a motor vehicle with a transmission. The transmission has a plurality of wheel sets for engaging and disengaging transmission gears and a plurality of shift clutches which can be operated by an operating device for engaging and disengaging transmission gears. In the transmission, at least one shift clutch to be shifted is operable while a shifted shift clutch is still engaged. The unit (10) is designed to guide at least during one shifting operation the shift clutch ($S_{1,3}$, $S_{2,4}$, $S_{5,6}$) to be shifted to its synchronizing point when the shifted shift clutch ($S_{1,3}$, $S_{2,4}$, $S_{5,6}$) is still engaged, and to guide an input clutch (11) of the transmission at least before the end of a synchronizing operation of the shift clutch ($S_{1,3}$, $S_{2,4}$, $S_{5,6}$) to be shifted by way of an actuator (12) of the transmission into its opening position.

24 Claims, 5 Drawing Sheets

SYSTEM HAVING A UNIT FOR CONTROLLING A TRANSMISSION LINE

This application claims the priority of German Patent Document No. 101 50 720.8, filed Oct. 13, 2001, the disclosure of which is expressly incorporated by reference herein.

BACKGROUND AND SUMMARY OF THE INVENTION

The invention relates particularly to a system having a unit for controlling a transmission line.

International Patent Document WO 93/10378 A1 discloses a system of the above-mentioned type. The system has a control unit for controlling a transmission line of a motor vehicle, which has a transmission having a first plurality of wheel sets for engaging and disengaging transmission gears and a plurality of shift clutches. The shift clutches can be shifted by the operating units of an operating device. Two shift clutches are combined to form a shift stack, and two non-successive transmission gears are assigned to each shift stack.

An operating unit is assigned to each shift stack, which operating unit can be operated and controlled independently of the operating units of the other shift stacks.

Shifting operations between transmission gears can be controlled such that the shift stacks are operated in an overlapping manner. Simultaneously or immediately successively, a shifted shift clutch can be moved to its neutral position and a shift clutch to be shifted can be moved toward its shifting position. During the upshifting, a shift clutch of a transmission gear higher than the transmission gear to be shifted can be loaded additionally to the shift clutch of the transmission gear to be shifted in order to reduce the speed of a countershaft.

In particular, it is an object of the invention to provide a system of the above-mentioned type by which reduced shifting times can be reached.

The invention is based on a system having a unit for controlling a transmission line, particularly of a motor vehicle. The motor vehicle has a transmission having a plurality of wheel sets for engaging and disengaging transmission gears and having a plurality of shift clutches which can be operated by an operating device for engaging and disengaging transmission gears. At least one shift clutch to be shifted is operable while a shifted shift clutch is still engaged.

The unit for controlling a transmission line guides, at least during one shifting operation, the shift clutch to be shifted to its synchronizing point, while the shifted shift clutch is still engaged. The unit also guides an input clutch of the transmission, at least before the end of a synchronizing operation of the shift clutch to be shifted, into its opening position by way of an actuator. Fast and comfortable shifting operations can be achieved despite a low stressing of the respective shift clutches, and special engaging mechanisms for an engagement under a load can be avoided. The unit should be able to contain a controlling and/or a regulating function.

If during a reduction of the moment at the shifted shift clutch in a shifting operation, the unit brings the shift clutch to be shifted at least to a partial level of a maximal synchronization moment, additional shifting time can be saved.

In a further development of the invention, during a shifting operation, the unit brings the shift clutch to be shifted to the maximum synchronization moment after the disengaging of the previously shifted shift clutch, whereby low loads of the shift clutches can be achieved during the shifting operation. However, under certain conditions, for example, in a kick-down mode, the maximal synchronization moment is already set before the disengagement.

In addition, during a shifting operation, the unit operates the shift clutch to be shifted as a function of a rotational speed of the input shaft of the transmission. A flexible control can be achieved, during which shifting operations can be implemented in accordance with the rotational speed of the input shaft. As a function of the rotational speed of the input shaft, the point in time can be determined at which the shift clutch to be shifted is brought to the synchronous point, when the shift clutch to be sifted is set to a partial level of the maximal synchronization moment, and/or when the maximal synchronization moment is set. In addition, as a function of the rotational speed of the input shaft, the extent of the partial level and/or of the maximal synchronization moment can also be determined. The rotational speed of the input shaft is a value which is very important for the shifting operation. However, the shifting operation may be controlled as a function of other operating parameters, for example, as a function of the rotational speed of an output shaft, of adjusting paths of the input clutch and/or of a shift clutch, of the driving speed, of the transmission oil temperature, of a selected operating program, etc.

If, during a shifting operation, the unit changes a gradient of the moments of the input clutch during its opening operation, shifting time can be saved again, comfort can be increased and the stressing of the shift clutches can be reduced. This may occur specifically when, during the shifting operation, the unit increases at least for a short time an opening speed of the input clutch before its opening position.

Advantageously, during a shifting operation, the unit changes the gradient of the moments of the input clutch as a function of the rotational speed of the input shaft. A flexible control can be achieved during which shifting operations are adapted to the rotational speed of the input shaft. As a function of the rotational speed of the input shaft, the time can be determined at which the gradient is changed and to what extent it is changed. In addition to the rotational speed of the input shaft, the gradient can be changed as a function of other operating parameters, for example, the rotational speed of an output shaft, adjusting paths of the input clutch and/or of a shift clutch, the driving speed, the transmission oil temperature, a selected operating program, etc.

In a further development, during a shifting operation, as a function of a tolerance value, the unit avoids a negative output moment, specifically in the case of upshifts under tension. An undesirable braking of the motor vehicle during the shifting operation can be reliably avoided and comfort can be increased.

If the tolerance value can be set as a function of at least one detected operating parameter, such as the friction lining thickness of the input clutch, transmission oil consistency, transmission oil temperature, service life, etc., a learning system can be obtained, and shifting operations can always be achieved which are optimized corresponding to the conditions.

Furthermore, during a shifting operation between the fifth and the sixth transmission gears, the unit leads the shift clutch to be shifted to its synchronization point, after the previous shifted shift clutch has disengaged. The shift clutches for the fifth and sixth transmission gears may have a standard construction, particularly that of a unit, and a cost-effective compact overall construction can be achieved.

If the operating device has at least one controller cylinder, by way of which the at least two shift clutches can be shifted, space can also be saved and a particularly cost-effective, low weight and space-saving construction can be achieved. If the operating device has at least two actuators, by way of which at least two shift clutches can be shifted, a particularly flexible control can be achieved.

In a further development of the invention, a transmission series is suggested which has a manual transmission and an automatic transmission. In the case of the automatic transmission, wheel sets for the second and the third transmission gear can be arranged in an exchanged manner. At a reasonable cost, a transmission series can be obtained which has a manual and an automatic transmission. In addition, particularly in a simple construction, an automatic transmission can be achieved which is suitable for the system according to the invention. Specifically, one shifting unit can be assigned to the first and the third transmission gear and another shifting unit can be assigned to the second and the fourth transmission gear, or one shifting unit can in each case be assigned to two non-successive transmission gears.

Other objects, advantages and novel features of the present invention will become apparent from the following detailed description of the invention when considered in conjunction with the accompanying drawings.

DETAILED DESCRIPTION OF THE DRAWINGS

Figure 1:
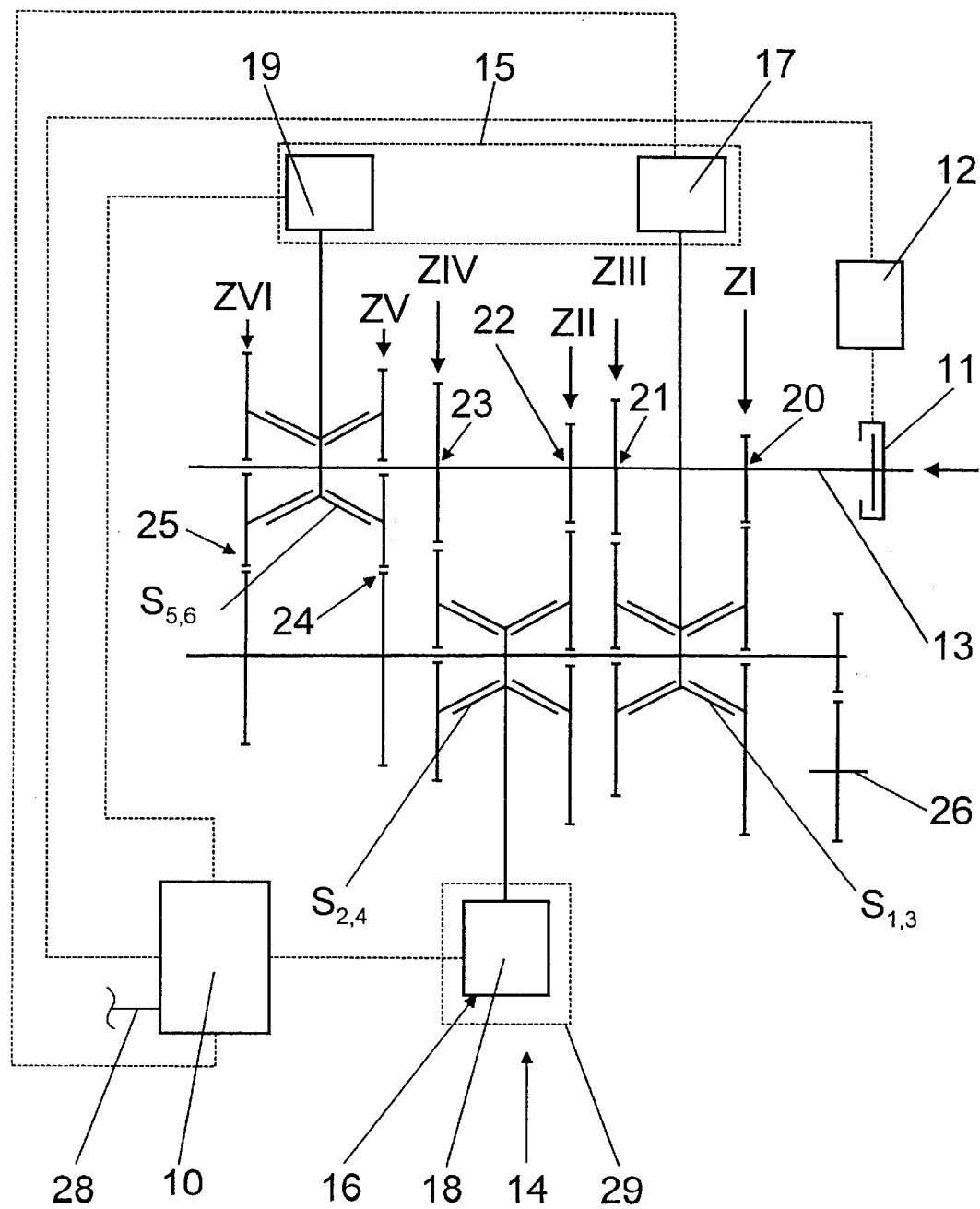
FIG. 1 is a schematic representation of a transmission.

FIG. 1 illustrates a schematically represented transmission with a control unit 10 for controlling the transmission or a transmission line of a motor vehicle which is not shown in detail. The transmission has six wheels sets 20, 21, 22, 23, 24, 25 for engaging and disengaging six forward transmission gears ZI, ZII, ZIII, ZIV, ZV, ZVI and three shift clutches $S_{1,3}$, $S_{2,4}$, $S_{5,6}$ or synchronizing units which can be operated by an operating device 16 with three individual actuators 17, 18, 19 for engaging and disengaging the transmission gears ZI, ZII, ZIII, ZIV, ZV, ZVI. The illustrated automatic transmission is part of a transmission series with a manual transmission which is not shown in detail. For a conversion from the manual transmission to the automatic transmission, only the wheel sets 21, 22 for the second and third transmission gear ZII, ZIII are exchanged.

Instead of an operating device 16 with several actuators 17, 18, 19, an operating device 14 with controller cylinders 15, 29 is also conceivable. In this case, by way of the first controller cylinder 15, two shift clutches $S_{1,3}$, $S_{5,6}$ can be shifted and, by way of the second controller cylinder 29, the shift clutch $S_{2,4}$ can be shifted, as indicated in FIG. 1.

In the case of a shifting operation under tension between the first and the second, the second and the third, the third and the fourth as well as between the fourth and the fifth transmission gear ZI, ZII, ZIII, ZIV, ZV, the control unit 10 leads the shift clutch $S_{1,3}$, $S_{2,4}$ or $S_{5,6}$ to be shifted to its synchronization point, while the shifted shift clutch $S_{1,3}$, $S_{2,4}$ or $S_{5,6}$ is still engaged. Furthermore, the control unit 10 leads an input clutch 11 formed by a friction clutch before the end of a synchronizing operation of the shift clutch $S_{1,3}$, $S_{2,4}$ or $S_{5,6}$ to be shifted by way of an actuator 12 into its opening position.

Figure 2:
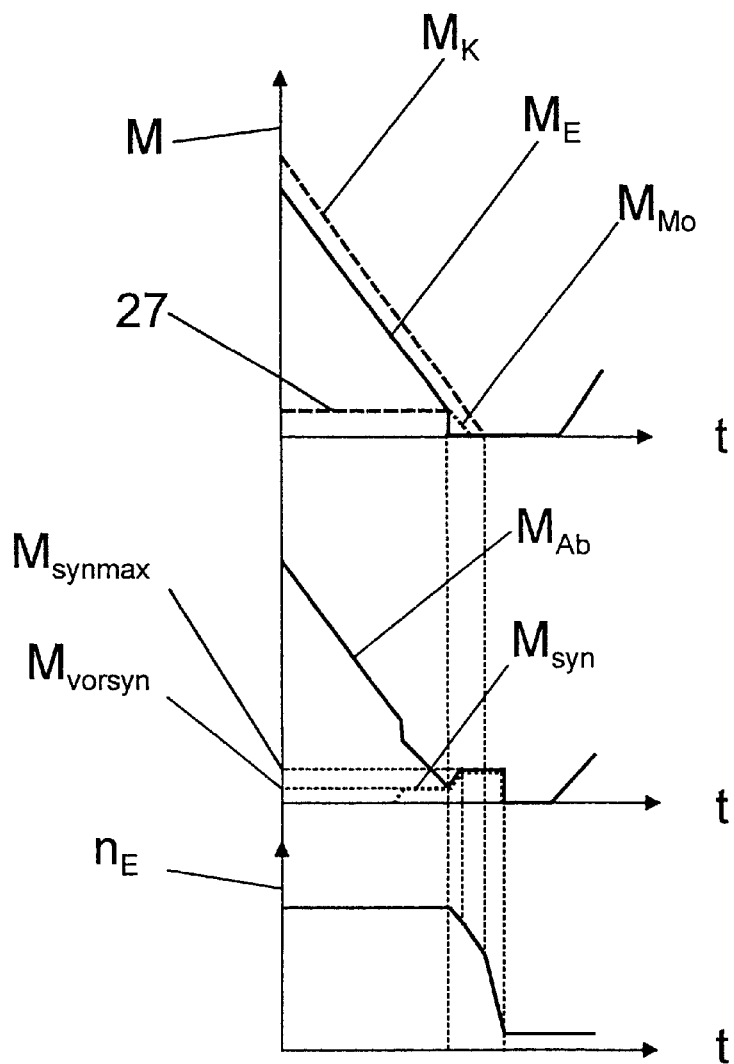
FIG. 2 illustrates diagrams for an upshifting operation under tension of the transmission from FIG. 1.

FIG. 2, in a first diagram, shows moments $M_K$ of the input clutch 11, moments $M_E$ of an input shaft 13 of the transmission and moments $M_{Mo}$ of an internal-combustion engine over the time t as an example of an upshifting operation under tension from the first into the second transmission gear ZI, ZII. In this respect, in a second diagram, moments $M_{Ab}$ of an output shaft 26 of the transmission and synchronization moments $M_{syn}$ of the shift clutch $S_{2,4}$ to be shifted, and in a third diagram, rotational speed $n_e$ of the input shaft 13 are entered above the time t. For an upshifting operation under tension from the second into the third, from the third into the fourth and from the fourth into the fifth transmission gears ZI, ZII, ZIII, ZV, corresponding curves may be entered.

While the shift clutch $S_{1,3}$ is still engaged, the control unit 10 leads the shift clutch $S_{2,4}$ to be shifted by way of the actuator 18 to its synchronization point. In addition, the control unit 10 opens the input clutch 11 by way of the actuator 12. After the synchronization point of the shift clutch $S_{2,4}$ to be shifted has been reached, during a reduction of moments at the shifted shift clutch $S_{1,3}$, the control unit 10 brings the shift clutch $S_{2,4}$ to be shifted to a partial level $M_{vorsyn}$ of a maximal synchronization moment $M_{synmax}$. When a pretensioning 27 by the actuator 17 of the shifted shift clutch $S_{1,3}$ is achieved and the latter disengages, the control unit 10 will control the shift clutch $S_{2,4}$ to be shifted by way of the actuator 18 to a maximal synchronization moment $M_{synmax}$.

The control unit 10 controls the shift clutch $S_{2,4}$ to be shifted during the shifting operation as a function of the rotational speed $n_e$ of the input shaft 13. Furthermore, the control unit 10 controls the shifted shift clutch $S_{1,3}$, the shift clutch $S_{2,4}$ to be shifted and the input clutch 11 by way of the actuators 12, 17, 18 as a function of a stored tolerance value, so that a negative output moment $M_{Ab}$ of the output shaft 26 is avoided. The tolerance value is stored in the control unit 10 and can be adjusted or corrected by way of detected operating parameters, particularly as a function of a service life of the input clutch 11 and detected characteristic values of friction linings of the input clutch. The operating parameters are supplied to the control unit 10 by way of a data line 28 connected to a data bus of the motor vehicle.

When the synchronization moment $M_{syn}$ falls to zero and the shift clutch $S_{2,4}$ is engaged, the shifting operation is concluded.

In the case of a shifting operation between the fifth and the sixth transmission gear ZV, ZVI, the control unit 10 leads the shift clutch $S_{5,6}$ to be shifted to its synchronization point after the previously shifted shift clutch $S_{5,6}$ has disengaged.

Figure 3:
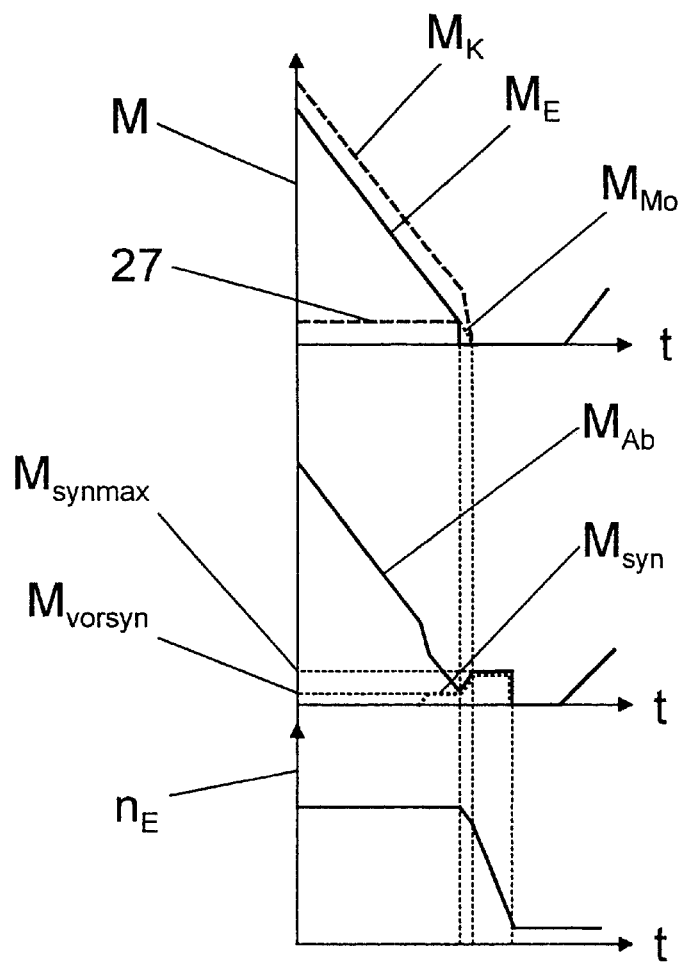
FIG. 3 illustrates diagrams of a shifting operation which is an alternative to FIG. 2 and in which an opening speed of an input clutch is increased just before its opening position.
Figure 4:
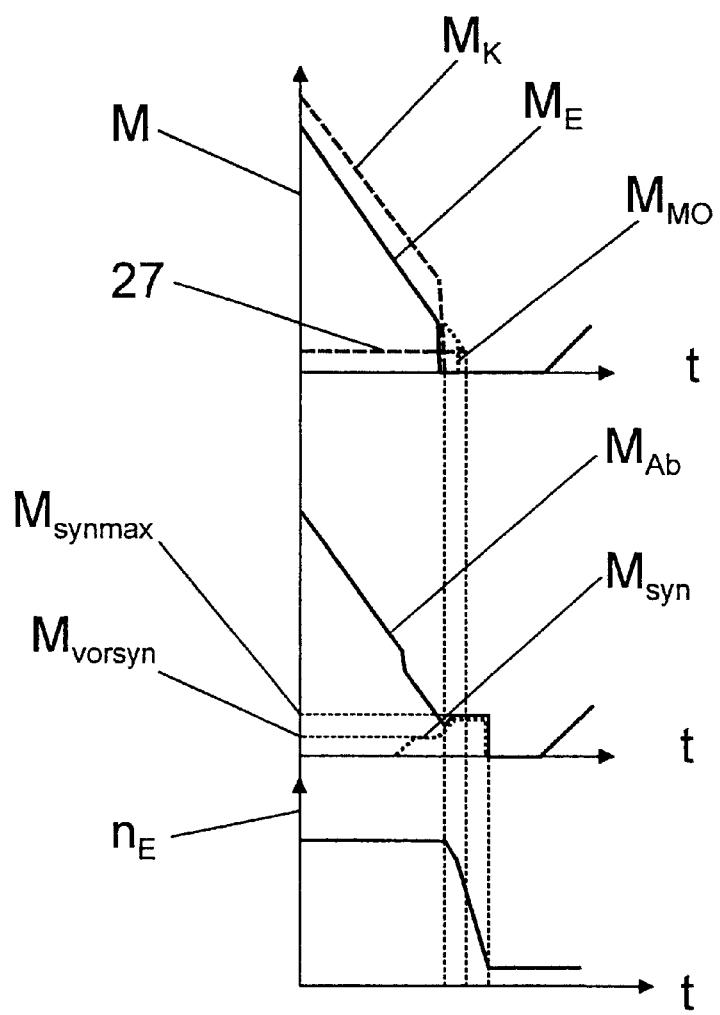
FIG. 4 illustrates diagrams of a shifting operation which is an alternative to FIG. 3, with a prematurely accelerated opening of the input clutch.

FIGS. 3 and 4 show alternative shifting operations. With respect to characteristics and functions which remain the same, reference can be made to the description of the embodiment in FIG. 2. The following description is essentially limited to the differences with respect to the embodiment in FIG. 2.

By way of the actuator 12, the control unit 10 increases the opening speed of the input clutch 11 during the shifting operation just before its opening position, whereby the gradient of moments $M_K$ of the input clutch 11 changes during an opening operation of the input clutch 11. During the shifting operation in FIG. 3, the control unit 10 increases the opening speed of the input clutch 11 at the time of the disengaging of the previously shifted shift clutch $S_{1,3}$ or shortly after the shifted shift clutch $S_{1,3}$ has disengaged, or as soon as a moment has been reached at the shifted shift clutch $S_{1,3}$ that the latter is disengaged by the pretensioning 27.

During the shifting operation in FIG. 4, the control unit 10 increases the opening speed of the input clutch 11 before, at the shifted shift clutch $S_{1,3}$, a moment is reached at which the shifted shift clutch $S_{1,3}$ is disengaged. During both shifting operations, the control unit 10 controls the gradient of the moments $M_K$ of the input clutch 11 in addition as a function of a detected rotational speed $n_E$ of the input shaft 13.

The shifting operation in FIG. 3 is shortened with respect to the shifting operation in FIG. 2, and the shifting operation in FIG. 4, in turn, is shortened with respect to the shifting operation in FIG. 3.

Figure 5:
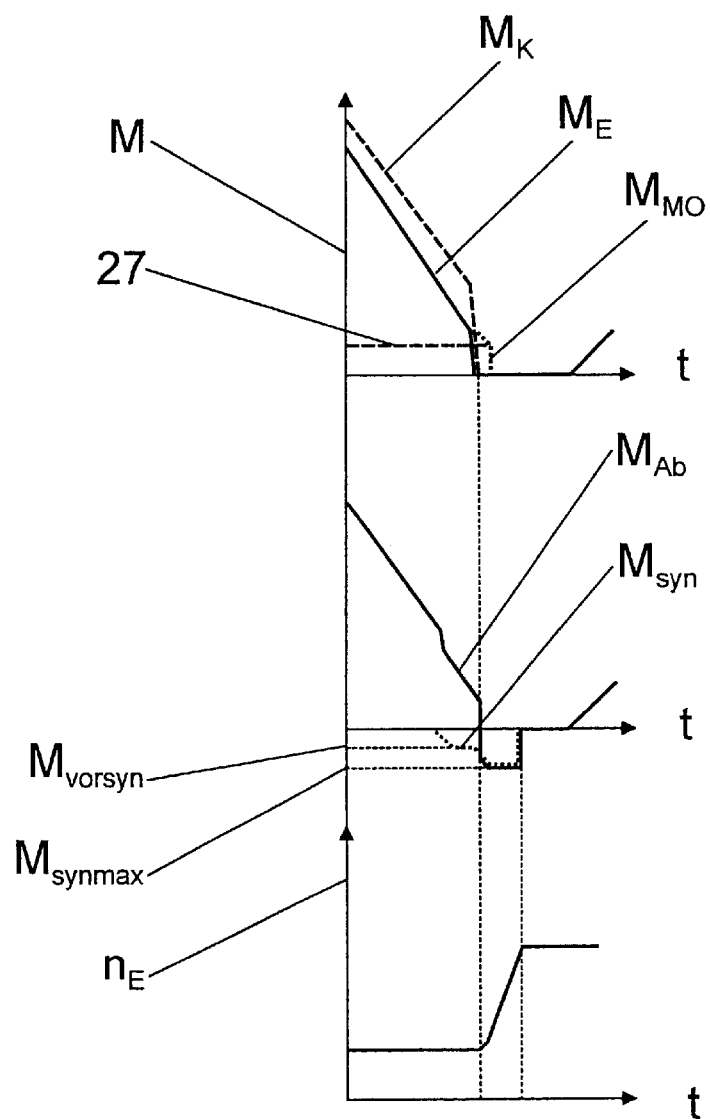
FIG. 5 illustrates diagrams of a downshift operation under tension of the transmission of FIG. 1.

In FIG. 5, diagrams are illustrated for a downshift operation under tension which, with respect to the shifting principle, corresponds to the shifting operation in FIG. 4. During the downshift operation, a negative synchronization moment $M_{syn}$ occurs because a rotational speed $n_E$ of the input shaft 13 during the synchronization operation is lower than a target rotational speed of the input shaft 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A system comprising:
    a unit for controlling a transmission line of a motor vehicle having a transmission having a plurality of wheel sets for engaging and disengaging transmission gears and having a plurality of shift clutches which can be operated by an operating device for engaging and disengaging transmission gears, at least one shift clutch to be shifted being operable while a shifted shift clutch is still engaged,
    wherein the unit is designed to guide at least during one shifting operation the shift clutch to be shifted to its synchronizing point when the shifted shift clutch is still engaged, and to guide an input clutch of the transmission at least before the end of a synchronizing operation of the shift clutch to be shifted by way of an actuator of the transmission into its opening position.

2. The system according to claim 1, wherein during the shifting operation, during a reduction of moments at the shifted shift clutch, the unit brings the shift clutch to be shifted at least to a partial level of a maximal synchronization moment.

3. The system according to claim 2, wherein during the shifting operation, the unit brings the shift clutch to be shifted after the disengagement of the previously shifted shift clutch to the maximal synchronization moment.

4. The system according to claim 1, wherein during the shifting operation, the unit operates the shift clutch to be shifted as a function of a rotational speed of an input shaft of the transmission.

5. The system according to claim 1, wherein during the shifting operation, the unit changes a gradient of the moments of the input clutch during its opening operation.

6. The system according to claim 5, wherein during the shifting operation, the unitdownshift increases an opening speed of the input clutchdownshift before its opening position.

7. The system according to claim 5, wherein during the shifting operation, the unitdownshift changes the gradient of the moments of the input clutchdownshift as a function of the rotational speed of an input shaftdownshift of the transmission.

8. The system according to claim 1, herein during the shifting operation, the unitdownshift avoids negative output moment based on a tolerance value.

9. The system according to claim 8, wherein the tolerance value can be adjusted as a function of at least one detected operating parameter.

10. The system according to claim 1, wherein during a shifting operation between the fifth and the sixth transmission gears, the unitdownshift leads the shift clutch to be shifted to its synchronization point, after the previously shifted shift clutch is disengaged.

11. A transmission comprising the system according to claim 1.

12. The transmission according to claim 11, wherein the operating device has at least one controller cylinder by way of which at least two shifting clutches can be shifted.

13. The transmission according to claim 12, wherein the operating device has at least two actuators by way of which at least two shift clutches can be shifted.

14. A transmission series comprising a manual transmission and an automatic transmission, according to claim 11, wherein in the automatic transmission, wheel sets for a second transmission gear and a third transmission gear are arranged in an exchanged manner.

15. A method for controlling a transmission line of a motor vehicle having a transmission having a plurality of wheel sets for engaging and disengaging transmission gears and having a plurality of shift clutches which can be operated by an operating device for engaging and disengaging transmission gears, at least one shift clutch to be shifted being operable while a shifted shift clutch is still engaged, the method comprising:
    during a shifting operation, guiding the shift clutch to be shifted to its synchronizing point when the shifted shift clutch is still engaged, and guiding an input clutchdownshift of the transmission at least before the end of a synchronizing operation of the shift clutch to be shifted into its opening position.

16. The method according to claim 15, further comprising:
    during a reduction of moments at the shifted shift clutch, bringing the shift clutch to be shifted at least to a partial level of a maximal synchronization moment.

17. The method according to claim 16, further comprising:
    bringing the shift clutch to be shifted after the disengagement of the previously shifted shift clutch to the maximal synchronization moment.

18. The method according to claim 15, further comprising:

operating the shift clutch to be shifted as a function of a rotational speed of an input shaftdownshift of the transmission.

19. The method according to claim 15, further comprising:

changing a gradient of the moments of the input clutchdownshift during its opening operation.

20. The method according to claim 19, further comprising:

increasing an opening speed of the input clutchdownshift before its opening position.

21. The method according to claim 20, further comprising:

changing the gradient of the moments of the input clutchdownshift as a function of the rotational speed of an input shaftdownshift of the transmission.

22. The method according to claim 15, further comprising:

avoiding negative output moment based on a tolerance value.

23. The method according to claim 22, further comprising:

adjusting the tolerance value as a function of at least one detected operating parameter.

24. The method according to claim 15, further comprising:

during a shifting operation between the fifth and the sixth transmission gears, leading the shift clutch to be shifted to its synchronization point, after the previously shifted shift clutch is disengaged.

* * * * *